United States Patent [19]

Barnett et al.

[11] Patent Number: 4,871,570

[45] Date of Patent: Oct. 3, 1989

[54] FOODSTUFFS CONTAINING HYDROBENZENE ORGANIC ACIDS AS SWEETNESS MODIFYING AGENTS

[75] Inventors: Ronald E. Barnett; Ronald G. Yarger, both of Suffern, N.Y.

[73] Assignee: General Foods Corp., White Plains, N.Y.

[21] Appl. No.: 669,051

[22] Filed: Nov. 6, 1984

Related U.S. Application Data

[63] Continuation of Ser. No. 477,790, Mar. 22, 1983, abandoned, which is a continuation-in-part of Ser. No. 274,035, Jun. 15, 1981, abandoned.

[51] Int. Cl.$^4$ .......................... A23L 1/22; A23L 1/236
[52] U.S. Cl. ..................................... 426/535; 426/538; 426/548; 514/572
[58] Field of Search ................... 426/548, 535; 514/572

[56] References Cited

PUBLICATIONS

Belitz et al. Sweet and Bitter Compounds: Structure and Taste Relationships, In *Food Taste Chemistry*, ACS Symposium Series 115, ACS: Wash., D. C., pp. 93–131 (1979).

*Primary Examiner*—Joseph Golian
*Attorney, Agent, or Firm*—Linn I. Grim; Daniel J. Donovan

[57] ABSTRACT

Food acceptable sweetness modifying compounds comprising certain hydroxy aromatic acids having the formula

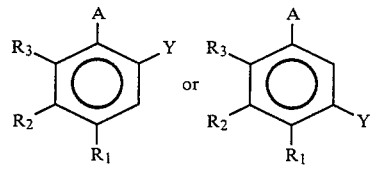

wherein A e.g. is COOH or SO$_3$H, Y is hydroxy and R$_1$, R$_2$ and R$_3$ are e.g. hydrogen or alkyl and foodstuff compositions containing the same. Other sweetness modifying agents included within the scope of the invention include 2,3-dihydroxybenzoic acid, 2-hydroxy-4-aminobenzoic acid and 3-hydroxy-4-aminobenzoic acid.

12 Claims, No Drawings

FOODSTUFFS CONTAINING HYDROBENZENE ORGANIC ACIDS AS SWEETNESS MODIFYING AGENTS

CROSS-REFERENCE TO RELATED APPLICATIONS

This application is a continuation of U.S. application Ser. No. 477,790, filed Mar. 22, 1983, now abandoned, which in turn is a continuation-in-part application of U.S. application Ser. No. 274,035, filed June 15, 1981, now abandoned, the entire contents of each of these applications are incorporated by reference herein.

BACKGROUND OF THE INVENTION

This invention relates generally to sweetness modification and more particularly to low-caloric compounds, particularly well suited as sweetness modifiers in edible foodstuffs.

Sweetness is one of the primary taste cravings of both animals and humans. Thus, the utilization of sweetening agents in foods in order to satisfy this sensory desire is well established.

Naturally occuring carbohydrate sweeteners, such as sucrose, are still the most widely used sweetening agents. While these naturally occurring carbohydrates, i.e. sugars, generally fulfill the requirements of sweet taste, the abundant usage thereof does not occur without deleterious consequences, e.g. high caloric input, dental decay and nutritional imbalance. In fact, often times the level of these sweeteners required to satisfy taste in foodstuffs is far higher than that level of sweetener which is desired for economic, dietetic or other functional considerations.

In an attempt to eliminate the disadvantages concomitant with natural sweeteners, considerable research and expense have been devoted to the production of artifical sweeteners, such as for example, saccharin, cyclamate, dihydrochalcone, aspartame, etc. While some of these artifical sweeteners satisfy the requirements of sweet taste without caloric input and have met with considerable commercial success, they are not, however, without their own inherent disadvantages. For example, many of these artifical sweeteners have the disadvantages of high cost of production, as well as delay in perception of the sweet taste, persistent lingering of the sweet taste, and very objectionable bitter, metallic aftertaste when used in food products.

Since it is believed that many of the disadvantages of artificial sweeteners, particularly after-taste is a function of the concentration of the sweeteners, it has been previously suggested, that these effects could be reduced or eliminated by combining artificial sweeteners, such as saccharin, with other ingredients or natural sugars, such as pectin, sorbitol, dextrose, maltose, etc. These combined products, however, have not been entirely satisfactory either. Some U.S. patents which disclose sweetener mixtures include, for example, U.S. Pat. Nos. 4,228,198, 4,158,068, 4,154,862, 3,717,477.

More particularly, U.S. Pat. No. 4,228,198 discloses a sweetening composition comprised of a protein sweetener, saccharin or cyclamate in combination with a sweetness modifier, namely arabinogalactan. The patentee states that the arabinogalactan enhances the overall sweetness of the composition and reduces or eliminates the after taste.

U.S. Pat. No. 4,158,068 discloses a sweetener mixture having an improved saccharose-like taste consisting of acetosulfame and at least one sweetener from the group of aspartyl peptide ester, the sulfamate sweeteners, the sulfimide sweeteners and diydrochalcone sweeteners.

Mixtures of artificial sweeteners, such as saccharin and the like, and neodiosmin are disclosed, in U.S. Pat. No. 4,154,862, to be of reduced bitterness and after taste.

U.S. Pat. No. 3,717,477 discloses that the sweetening potency and taste of sodium saccharin are improved by the addition of small amounts of optically active D-tryptophan.

The use of sweetening agents in foods to provide functions other than sweetening, such as to act as fillers, bulking agents, antimicrobial agents, freezing point depressants, stabilizers, etc. is also well established. For example, U.S. Pat. No. 3,597,236 discloses a composition, useful for preserving the color of meat, comprising ascorbic acid and a compound selected from the group consisting of para-aminobenzoic acid, m-aminobenzoic acid, isonicotinic acid and N-ethylnicotinamide, wherein dextrose is optionally employed as a carrier to provide a more uniform distribution of the preserving composition in and on the meat.

U.S. Pat. Nos. 2,752,332 and 2,709,657 disclose 2-amino-3-hydroxy-benzoic acid or its esters as antioxidants and/or stabilizing agents for certain vegetables. Other U.S. patent including U.S. Pat. Nos. 3,876,814, 3,952,058, 3,845,225 and 3,876,816 disclose certain aromatic amino compounds as sweeteners. That is, U.S. Pat. Nos. 3,876,814 and 3,952,058 disclose 3-amino-4-n-propylbenzyl alcohol as a non-nutritive sweetener for foods and beverages. U.S. Pat. No. 3,845,225 discloses compounds of the formula

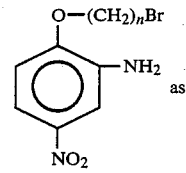

as sweetening agents for foodstuffs, while U.S. Pat. No. 3,876,816 discloses inter alia, 2-amino-4-nitrobenzoic acid as a sweetener.

Many times the amount of sweetening agent employed for these alternate functions provides an excessively sweet taste, thereby requiring a modification of the formulation to reduce the sweetener level with a concurrent reduction in providing the alternate function to the food product. One unsuccessful solution of the art was to add bitter or acidic ingredients to the food to reduce the sweetness perception; however, the resultant food then had an undesirable bitter or acidic taste. W. Jakinovick, Jr. Science, Vol.219, p 408–410 (1983) discloses methyl 4, 6-dichloro-4,6-dideoxy-α-D-galactopyranoside to inhibit sweet taste response in gerbils when the compound is combined with sucrose or saccharin.

Accordingly, in view of the aforementioned disadvantages associated with the use of known sweeteners, i.e., naturally occurring, artificial or combinations thereof, it becomes readily apparent that it would be highly desirable to (a) provide a sweetness modifying agent which when added to foodstuffs can greatly reduce the level of deleterious sweetener normally required and concomitantly eliminate or greatly diminish the numerous disadvantages associated with prior art sweeteners or (b) provide sweetness inhibiting agents which are non-caloric, which do not result in off-tastes and which when added to foodstuffs reduce the level of sweetness perceived without a concurrent reduction in the desirable properties of the foodstuff.

SUMMARY OF THE INVENTION

Accordingly, it is one object of the present invention to provide novel foodstuff compositions containing a sweetness modifying agent.

Another object of this invention is to provide foodstuff compositions containing a low-caloric sweetness moidfying agent.

Still another object of the present invention is to provide novel sweetness inhibiting compounds.

A further object of this invention is to provide foodstuff compositions containing a sweetness inhibiting agent.

A still further object of the present invention is to provide sweetness inhibiting agents, which when added to foodstuffs, greatly reduce or eliminate unwanted or unpleasant sweet tastes, thus increasing the palatability of overly sweet products.

Another object of this invention is to provide foodstuff compositions containing sweetness modifying agents which inhibit the sweetness perception of the foodstuff, without adding any off-tastes such as bitterness, acidity, etc. to the foodstuff.

Still another object of this invention is to provide foodstuff compositions containing a sweetness modifying agent which will increase the sweetness perception of the foodstuff.

A further object of this invention is to provide a process for inhibiting the sweetness perception of a foodstuff.

Another object of the present invention is to provide novel compounds which are useful in foodstuffs as sweetness modifying agents (inhibitors or sweeteners).

These and other objects are accomplished herein by providing food-acceptable sweetness modifying compounds, i.e. sweeteners or sweetness inhibitors, which when added to a foodstuff and depending upon the particular compound employed, increases or inhibits the sweet taste perceived from the foodstuff, said food acceptable sweetness modifying compounds having the general formula:

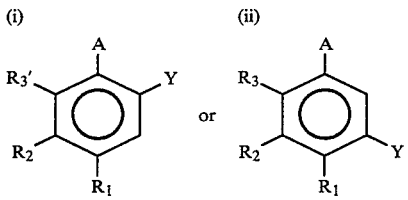

wherein:

A is an acid group of the structure —$ZO_qH_r$ or salt thereof wherein Z is an element selected from the group consisting of carbon, sulfur, boron and phosphorus, q is an integer from 2 to 3 and r is an integer from 1 to 3;

Y is OH or salt thereof;

$R_1$ $R_2$ and $R_3$ is independently selected from the group consisting of H, alkyl from 1 to 3 carbons, cyclopropyl, OH, $OCH_3$, $OCH_2CH_3$, $CH_2OCH_3$, $CH_2CH_2OH$, $CH(CH_3)CH_2OH$, CHO, $COCH_3$, $CH_2CHO$, COOH, $CH_2COOH$, $COOCH_3$, $OCOCH_3$, $CONH_2$, NHCHO, F, Cl, Br, I, $CF_3$, $SCH_3$, $SCH_2CH_3$, $CH_2SCH_3$, $SO_3H$, $SO_2NH_2$, $SO_2CH_3$, $SOCH_3$, $CH_2SO_3H$ and $CH_2SONH_2$; and with the provision that in structure (ii) when A is COOH, $R_1$, $R_2$ and $R_3$ are not all hydrogen.

DETAILED DESCRIPTION OF THE INVENTION

In accordance with the present invention, it has been surprisingly discovered that the sweet taste perceived in a food product can be greatly modified, i.e. sweetened or inhibited, by the addition of the food product of a compound with certain classes of compounds described in more detail hereinafter.

Thus, according to the present invention it has been unexpectedly found that certain compounds, described in more detail hereinafter, are effective sweetness modifiers with any of a number of known natural and/or artificial sweeteners including, for example, sucrose, fructose, corn syrup solids, dextrose, xylitol, sorbitol, mannitol, acesulfam, thaumatin, invert sugar, saccharin, cyclamate, dihydrochalcone, aspartame (L-aspartyl-L-phenylalanine methyl ester) and other dipeptides, glycyrrhizin, stevioside and the like.

Typical foodstuffs and pharmaceutical preparations, in which the sweetness modifiers of the present invention may be used are, for example, beverages including soft drinks, carbonated beverages, ready to mix beverages and the like, infused foods (e.g. fruits or vegetables), sauces, condiments, salad dressings, juices, syrups, desserts, including puddings, gelatin and frozen desserts, like ice creams, sherbets, and icings, confections, toothpaste, mouthwashes, chewing gum, intermediate moisture foods (e.g. dog foods) and the like.

More specifically the sweetness modifying agents of this invention have the general formula:

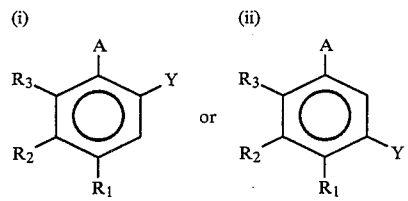

wherein:

A is an acid group of the structure —$ZO_qH_r$ or salt thereof wherein Z is an element selected from the group consisting of carbon, sulfur, boron and phosphorus, q is an integer from 2 to 3 and r is an integer from 1 to 3;

Y is OH or salt thereof;

$R_1$, $R_2$ and $R_3$ are independently selected from the group consisting of H, alkyl from 1 to 3 carbons, cyclopropyl, OH, $OCH_3$, $OCH_2CH_3$, $CH_2OCH_3$, $CH_2CH_2OH$, $CH(CH_3)CH_2OH$, CHO, $COCH_3$, $CH_2CHO$, COOH, $CH_2COOH$, $COOCH_3$, $OCOCH_3$, $CONH_2$, NHCHO, F, Cl, Br, I, $CF_3$, $SCH_3$, $SCH_2CH_3$, $CH_2SCH_3$, $SO_3H$, $SO_2NH_2$, $SO_2CH_3$, $SOCH_3$, $CH_2SO_3H$ and $CH_2SONH_2$; and with the provision that in structure (ii) when A is COOH, $R_1$, $R_2$ and $R_3$ are not all hydrogen.

Food acceptable non-toxic salts of the above-identified sweetness modifying agent of the present invention are contemplated. These salts include acid salts for example carboxylate as well as hydroxylate salts. Acid salts and/or hydroxylate salts include, sodium, potassium, calcium, magnesium, ammonium and the like and may be performed or formed in the food stuff by reaction with typical buffering agents, such as sodium phosphate, potassium citrate, sodium acetate, calcium phosphate, such as monocalcium phosphates and tricalcium phosphate, and the like which are also normally employed in foodstuffs to provide the desired pH.

Illustrative compounds with the above general formulas (i) and (ii) include:
2,4-dihydroxy benzoic acid;
3-hydroxy-4-methoxy benzoic acid;
3,5-dihydroxy benzoic acid. Other compounds within the scope of the present invention are 2,3-dihydroxybenzoic acid, 2-hydroxy-4-aminobenzoic acid and 3-hydroxy-4-aminobenzoic acid.

Many of the compound within the above formulas (i) and (ii) are sweetness inhibiting agents while others are sweeteners. Identification of these properties for many of these compounds is found hereinafter.

A preferred sweetness inhibiting agent within the scope of the present invention is 3,5-dihydroxy benzoic acid; 3-hydroxy-4-methoxybenzoic acid; and 3-hydroxy-4-aminobenzoic acid.

Compounds within the above formulas (i) and (ii) which are sweeteners include 2,3-dihydroxy benzoic acid; 2,4-dihydroxybenzoic acid; and 2 hydroxy-4-aminobenzoic acid.

As is readily apparent, depending upon the particular set of substituents, a given compound within the above formula may be a sweetness inhibitor or may be a sweetener. In order to determine whether a compound within the above general formula is a sweetness inhibitor or is sweet itself, a simple procedure is employed. This procedure involves making a 1% aqueous solution of the selected compound adjusted to pH 7 and a 0.2% aqueous solution of the selected compound adjusted to a pH 3. The solutions alone are tasted to determine whether the selected compound is a sweetener. To determine whether the compound is a sweetness inhibitor, solutions made up as above which also contain 5% sucrose are tasted and judged against 5% sucrose alone which has been adjusted to the same pH. If the compound has bitter, salty or sour tastes of its own, the bitter, salty or sour tastes are matched with urea, sodium chloride or citric acid, respectively, and the compound plus 5% sucrose tasted against 5% sucrose containing urea, sodium chloride, or citric acid at a level to match the off-tastes of the compound.

In accordance with the present invention, a sweetness inhibitor is defined to be a compound which, when mixed with a sweetener, reduces or eliminates the perceived sweetness without substantially contributing to the bitter, salty or sour taste of the foodstuff product. If a compound has a bitter, salty or sour taste of its own, it must be shown that the bitter, salty or sour taste is not sufficient to account for the substantial loss in sweetness perception.

Thus, one significant aspect of the present invention is that the inhibiting of the sweet taste of a food product by the sweetness inhibitors of the present invention is not due to the taste of the compound itself, but rather is due to an unexpected and highly surprising effect which results when the sweetness inhibitor is combined with a sweetener in the food product and tasted by the consumer. 3,5 dihydroxy benzoic acid is a preferred sweetness inhibiting agent within the scope of the present invention.

Accordingly, what is readily apparent from the discovery herein is that the utilization of even very small quantities of the inhibiting modifiers described herein can reduce or even eliminate the undesirable sweet and/or lingering aftertastes of certain sweeteners in food products containing natural and/or artificial sweeteners, without affecting the other desirable tastes and properties of the food.

In order to achieve the surprising modifying results of the present invention, the modifying compounds described herein are generally added to the food products at a level which is effective to inhibit the sweetness perception of the food product or potentiate the sweetness of the food product. More particularly, it has been found that the astonishing results provided by the present invention occur when the sweetener or inhibiting agent is added to the food product (containing a sweetener) in an amount in the range of from about 0.001 to 2% by weight based on the weight of the consumed product. Greater amounts are operable but not practical. Preferred amounts are in the range of from about 0.01 to 1% and most preferably 0.1 to 0.5% by weight of the foodstuff.

Generally, the inhibiting or sweetening effect provided by the present compounds is experienced over a wide pH range, e.g. 2 to 10 preferably 3 to 7 and in buffered or unbuffered formulations.

Many of the compounds within the scope of the present invention are known and can be readily synthesized according to conventional synthetic procedures or can be commercially obtained. Many of the compounds are commercially available. Notwithstanding, these compounds can be readily prepared, for example, by (a) nitration of benzoic acid followed by reduction and diazotization, (b) oxidation and substituted nitrotoluenes, (c) sulfonation of nitrobenzenes followed by reduction or sulfonation of aniline or derivatives thereof and (d) nitration of benzenesulfonic acids followed by reduction and diazotization.

Compounds within formulas (i) and (ii), wherein A is $SO_2H$ can be prepared from a. the corresponding substituted phenylsulfochloride according to Gutmann, Zeitschrift fur Analytische Chemie 65, 251 or Gebauer-Fulnegg, Riesenfeld, Monatscheffe fur Chemie 47, 191, 194 or V. Braun, Kaiser, Berichte, 56, 550 or Beilstein XI, 1st edition, 4;

b. the corresponding substituted phenylmagnesium bromide according to Gilman, Fothergill, JACS 51 3506;

c. the corresponding substituted thiophenyl or diphenylsulfide according to Lecher, Holschneider, Berichte 57 757;

d. the corresponding substituted benzene sulfonylphenyldisulfide according to Hubacher, Organic Synthesis 15, 1935 or Booker, Chiled, Smiles, J. Chemical Society London, 1927, 1386-7;

e. The corresponding substituted benzene sulfonic acid according to (Twise, Smiles, JCS London, 127 1250).

f. The corresponding substituted diazoaniline according to Kharash, et al., JACS 43 612; and g. the corresponding substituted benzene sulfonic acid chloride according to Child, Smiles, JCS 1926 2699 or Bere, Smiles Organic Synthesis, Vol. 1, 2nd edition, 1941, 7.

Compounds wherein A is $PO_3H_2$ can be prepared from the corresponding nitrophenylhydroxyphosphoazobenzene according to Beilstein XVI, 1st supplement page 427.

Compounds wherein A is $PO_2H_2$ can be synthesized from the corresponding nitrophenyl phosphine according to Beilstein XVI, 791 or nitrophenyldichlorophosphine as taught by Michaelis, Ananow, Berichte 7, 1688 and Michaelis, Annalen, 181, 303.

Compounds wherein A is $BO_2H_2$ can be prepared as follows:

Hydrolysis of the corresponding nitrophenylborodichloride as taught by Michaelis, Behrens, Berichte 27, 248;

b. hydrolysis of the corresponding nitrophenylborodiisobutylate as taught by Khotinsky, Melamed, Berichte 42, 3033;

c. from the nitrophenylborodifluoride as taught by Beilstein XVI, 2nd supplement, 638; or d. nitration of the appropriate substituted benzene boronic acid as taught by Beilstein XVI, 3rd supplement 1276 or JACS 53, 711, 714 or Seaman & Johnson, JACS 53, 711, 716 followed by reduction to the corresponding amino compound.

For synthetic routes to $R_1$, $R_2$ and $R_3$, many of the desired compounds are commercially available or can be made from commercially available compounds by the routes described above. Otherwise, the starting materials can be made by standard methods of electrophilic aromatic substitution.

In order that those skilled in the art may better understand how the present invention may be practiced, the following examples are given by way of illustration and not by way of limitation. Unless otherwise indicated, all solutions are aqueous.

EXAMPLE 1

To a pH 3.0 buffered solution and a pH 7.0 buffered solution was added 0.2% of the sweetness agent. The sweetness of these solutions was then judged by a panel of experts against stock sucrose concentrations in identical buffered solutions.

| Compound | pH Tested | Sweetness Judgement |
|---|---|---|
| 2, 3-dihydroxy benzoic acid | 3 | 2-3% sucrose |
| | 7 | 2-3% sucrose |
| 2, 4,-dihydroxy benzoic acid | 3 | 2-3% sucrose |
| | 7 | 2-3% sucrose |
| 2-hydroxy-4-amino benzoic acid | 3 | 2.0% sucrose |
| | 7 | 1.0% sucrose |

EXAMPLE 2

To a pH 3.0 buffered solution and a pH 7.0 buffered solution containing 5% sucrose was added 0.2% of the sweetness agent. The sweetness of these solutions was then judged by a panel of experts against stock sucrose solutions at pH 3.0 and pH 7.0.

| Compound | pH Tested | Sweetness Judgement |
|---|---|---|
| 2,3-dihydroxy benzoic acid | 3 | 7-8% sucrose |
| | 7 | 7-8% sucrose |
| 2, 4-dihydroxy benzoic acid | 3, | 7-8% sucrose |
| | 7 | 7-8% sucrose |
| 2-hydroxy-4-amino benzoic acid | 3 | 5.5-7.0% sucrose |
| | 7 | 5.5-7.0% sucrose |

EXAMPLE 3

To a pH 7.0 buffered solution containing 15% sucrose was added varying amounts of a sweetness modifying agent, 3-hydroxy-4-methoxy benzoic acid. These solutions were tasted against stock sucrose solutions in pH 7.0 buffer. Tasters were asked to match sweetness of the test solutions and stock solutions.

| Modifier Concentration | Sucrose Match |
|---|---|
| 0.05% | 15.0% |
| 0.10% | 14.0% |
| 0.30% | 11.5% |
| 1.00% | 8.5% |
| 2.00% | 6.0% |

EXAMPLE 4

To a pH 7.0 buffered solution containing 5% sucrose was added 1.0% of the sweetness modifying agent. These solutions were than tasted by a panel of experts and examined against a pH 7.0 buffered solution containing only 5% sucrose. The tasters were then asked to judge the sweetness reduction of the sample containing the modifying agent.

| Compound | % Reduction In Sweetness |
|---|---|
| 3-hydroxy-4-amino benzoic acid | 40-50% |
| 3, 5-dihydroxy benzoic acid | 70-90% |

We claim:

1. A composition comprising a foodstuff or pharmaceutical preparations and a sweetness inhibiting agent, said sweetness inhibiting agent being present in amounts to perceive a sweetness inhibiting effect in said composition and having the structure selected from the group consisting of:

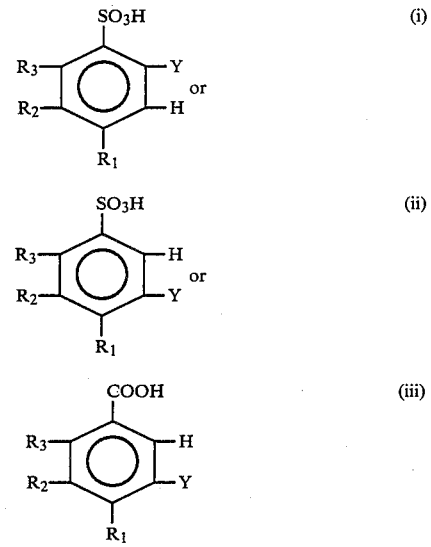

Wherein Y is an OH group or salt thereof; $R_1$, $R_2$ and $R_3$ each are selected from the group consisting of hydrogen, alkyl group containing from 1 to 3 carbon atoms, OH, $OCH_3$, $OCH_2CH_3$, CHO, $COCH_3$, COOH, $COOCH_3$, $OCOCH_3$, $CONH_2$, $SO_2NH_2$ and $NH_2$ and with the provisio that in structure (iii), $R_1$, $R_2$ and $R_3$ are not all hydrogen and a further provisio that $R_2$ and $R_3$ are not $NH_2$.

2. The foodstuff composition of claim 1 wherein said foodstuff comprises a sweetner.

3. The foodstuff composition of claim 2 wherein said sweetener is selected from the group consisting of natural sweetener, an artificial sweetner and mixtures thereof.

4. The foodstuff composition of claim 3 wherein said sweetner is selected from the group consisting of sucrose, fructose, corn syrup solids, dextrose, xylitol, sorbitol, mannitol, acesulfam, thaumatin, invert sugar, saccharin, saccharin salts, cyclamate, dihydrochalcone, aspartame, stevioside, glycyrrhizin, mixtures thereof and salts thereof.

5. The foodstuff composition of claim 3 wherein the foodstuff is selected from the group consisting of beverages, sauces, desserts, confections, intermediate moisture foods and infused foods.

6. The foodstuff composition of claim 3 wherein said sweetness inhibitor is present in said foodstuff in an amount in the range of from about 0.001 to about 2% by weight of the foodstuff.

7. The foodstuff composition of claim 3 wherein said sweetness inhibitor is present in said foodstuff in an amount in the range of from about 0.1 to about 1% weight of foodstuff.

8. The foodstuff composition of claim 3 wherein said sweetness inhibitor is present in said foodstuff in an amount in the range of from about 0.1 to about 0.5% by weight of the foodstuff.

9. The composition of claim 1 wherein the sweetness inhibiting agent is 3-hydroxy-4-methoxy benzoic acid.

10. The composition of claim 1 wherein the sweetness inhibiting agent is 3-hydroxy-4-amino benzoic acid.

11. The composition of claim 1 wherein the sweetness inhibiting agents is 3, 5-dihydroxy benzoic acid.

12. A process for inhibiting the sweetness perception in a foodstuff or pharmaceutical preparations which comprises adding a sweetness inhibiting agent of claim 1 to said foodstuff or pharmaceutical preparation.

* * * * *